United States Patent
Neuhaus et al.

(10) Patent No.: US 7,603,457 B2
(45) Date of Patent: Oct. 13, 2009

(54) ARRANGEMENT FOR STATE MONITORING FOR COMPONENTS IN A PACKET SWITCHED COMMUNICATION NETWORK

(75) Inventors: Ralf Neuhaus, Lünen (DE); Rainer Uecker, Mülheim (DE)

(73) Assignee: Siemens Aktiengesellschaft, Munich (DE)

( * ) Notice: Subject to any disclaimer, the term of this patent is extended or adjusted under 35 U.S.C. 154(b) by 643 days.

(21) Appl. No.: 10/501,721

(22) PCT Filed: Dec. 18, 2002

(86) PCT No.: PCT/DE02/04639

§ 371 (c)(1),
(2), (4) Date: Jul. 15, 2004

(87) PCT Pub. No.: WO03/061200

PCT Pub. Date: Jul. 24, 2003

(65) Prior Publication Data

US 2005/0102409 A1    May 12, 2005

(30) Foreign Application Priority Data

Jan. 17, 2002  (DE) ................................ 102 01 649

(51) Int. Cl.
*G06F 15/173* (2006.01)
(52) U.S. Cl. ...................... 709/224; 709/223; 709/225; 709/226
(58) Field of Classification Search ................. 709/224, 709/223
See application file for complete search history.

(56) References Cited

U.S. PATENT DOCUMENTS

2002/0114278 A1* 8/2002 Coussement ................ 370/235
2002/0138612 A1* 9/2002 Sekizawa .................... 709/224

FOREIGN PATENT DOCUMENTS

| DE | 195 31 961 A1 | | 3/1997 |
| DE | 199 35 786 A1 | | 2/2001 |
| WO | WO 99/17523 | * | 4/1999 |
| WO | WO 01/35617 A2 | | 5/2001 |

* cited by examiner

*Primary Examiner*—William C Vaughn, Jr.
*Assistant Examiner*—Maceeh Anwari

(57) ABSTRACT

In a communications network, one component at a time can be monitored by at least one other component. To this end, a monitoring task is issued by a monitoring component, whereby this monitoring task contains the address of said component. Each component, which can be monitored and which monitors, is provided with communications means for carrying out direct data exchange. The monitoring component transmits the monitoring task directly to the component, which is to be monitored and which comprises both storage means for storing the addresses contained in the monitoring tasks as well as monitoring means for monitoring the state. A communications means is used to directly transmit a state to be monitored to the monitoring component at least in the event of a state change.

23 Claims, 1 Drawing Sheet

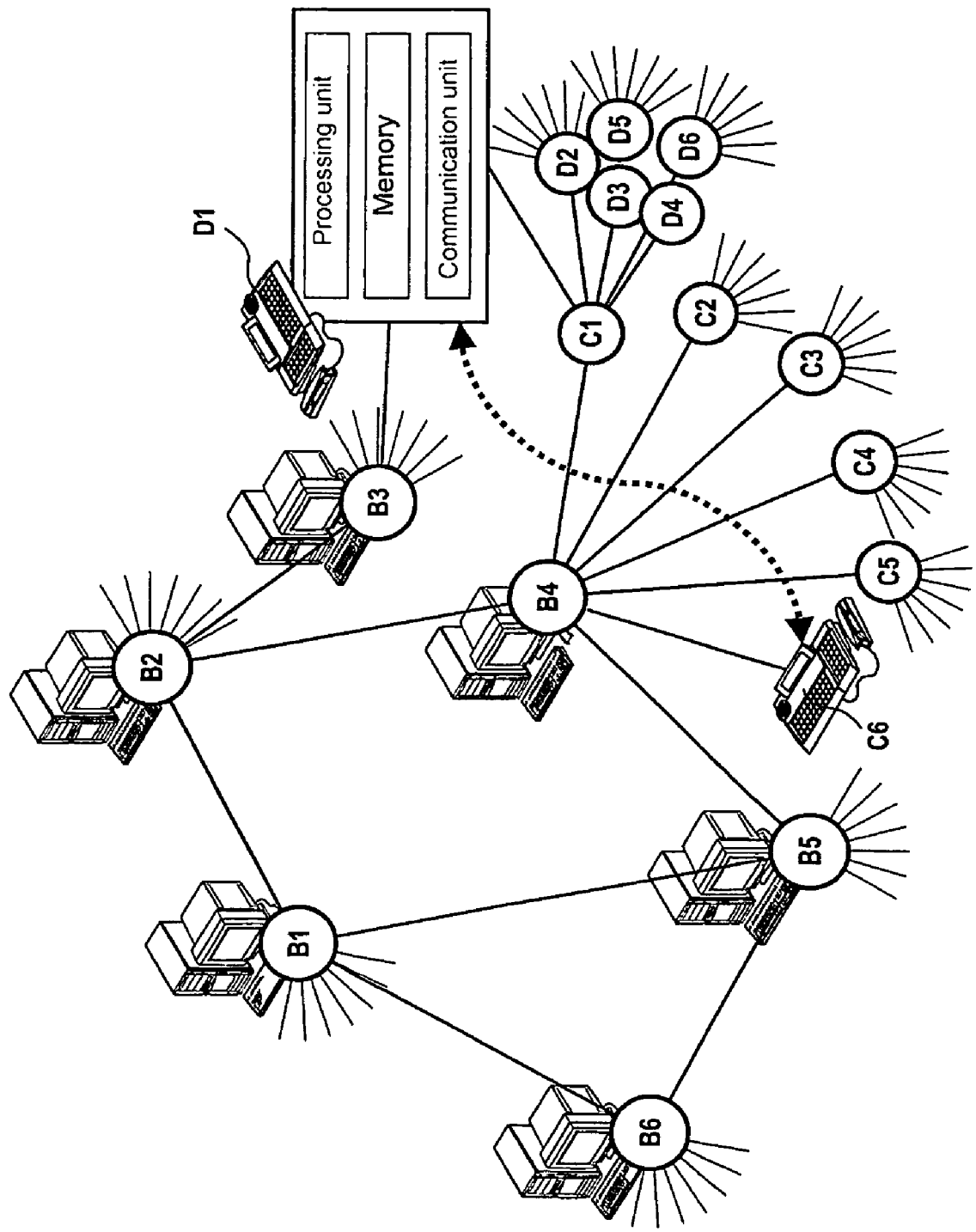

US 7,603,457 B2

ARRANGEMENT FOR STATE MONITORING FOR COMPONENTS IN A PACKET SWITCHED COMMUNICATION NETWORK

CROSS REFERENCE TO RELATED APPLICATIONS

This application is the US National Stage of International Application No. PCT/DE02/04639, filed Dec. 18, 2002 and claims the benefit thereof. The International Application claims the benefits of German application No. 10201649.6 filed Jan. 17, 2002, both of the applications are incorporated by reference herein in their entirety.

FIELD OF INVENTION

The invention relates to an arrangement for monitoring components in a communication network.

BACKGROUND OF INVENTION

It is known practice in modern communication networks to observe, by way of example, the network state of other parties in the same communication installation. Hence, busy lamp arrays or PC applications are used at the switchboard positions of the communication installations to indicate whether each party is currently free or busy or is in the call state.

In addition, terminals in communication installations are frequently equipped with direct call keys which can be used to call another party in the same communication installation by pressing a key. These direct call keys usually have an associated LED or other indicator element, with the network state of the associated party being indicated by the LED lighting or flashing, for example.

If a plurality of PC applications are intended to be operated in one communication installation, then the information about the network state of the visually indicated internal parties needs to be buffer-stored on a server and forwarded from there to the PCs to indicate the state. To this end, each monitoring PC application stores on the server the telephone numbers as addresses for the terminals which it is to monitor. The server then uses a data link to prompt the start of a monitoring process in the communication installation. This monitoring instruction is frequently also called "setting a monitoring point". In the event of a change of state in the monitored component, the communication installation sends a corresponding message to the server, which forwards it to the PC applications. A server may also collect and forward state information about the internal parties in a plurality of communication installations in a communication network in the manner of a network complex, by virtue of a respective data link being set up to each communication installation.

A drawback which has been found with the various arrangements is that the services for monitoring party states in a communication network are respectively limited to the parties in an individual communication installation or to the parties in a few communication installations combined into a network complex. Parties which are not connected to the same communication installation or to the same network complex, and also the service, cannot be monitored. In addition, connecting a plurality of appliances for the purpose of visually indicating party states and for the purpose of monitoring parties in a plurality of communication installations requires a central entity in the communication network, that is to say a server.

SUMMARY OF INVENTION

It is an object of the invention to allow the states of parties or, generally, of addressable components in a communication network to be monitored independently of their location.

This object is achieved by the claims. The dependent claims provide advantageous further refinements of the invention.

In relation to the apparatus, the solution provides for each monitorable and monitoring component to have communication means for direct data interchange, for the monitoring component to transmit the monitoring instruction directly to the component which is to be monitored, and for each monitorable component to have storage means for the addresses contained in the monitoring instructions and monitoring means for state monitoring which, at least in the event of a change of state, transfers a state to be monitored directly to the monitoring component using the communication means. The advantage of this solution is that monitoring takes place directly between components without any interposed service and that, in networks made up of subnetworks, a monitoring component arranged in a subnetwork can monitor other components in other subnetworks too, that is to say independently of their location.

Direct connections between components can be set up particularly easily if the communication network is a packed switched network (IP network).

If the number of addresses which can be registered in a storage means are prescribable, then the network loading brought about by the monitoring operations can be aligned.

The data interchange required for transferring changes of state is minimized by virtue of the monitoring instruction comprising information about which changes of state are to be transferred.

If the monitoring component uses the information about states or changes of state for visual indication and/or for storage and/or for forwarding to other components, then the information obtained can be evaluated flexibly.

Data protection requirements can be met by virtue of the monitored component being able to disable monitoring by individual or all monitoring components.

Unsuccessful call attempts between parties in a communication network can be avoided if, in cases in which a monitoring instruction cannot be transmitted, the monitoring component outputs a corresponding indicator and makes a fresh transmission attempt at stipulated intervals of time.

If the information about the transmitability of the monitoring instruction can be used to determine a network state for the component which is to be monitored, then the network state may also be indicated for those monitored components which do not transfer any information about their state or about their change of state to the monitoring component.

An exemplary embodiment of an arrangement based on the invention for monitoring components in a communication network is described below with reference to the drawing.

BRIEF DESCRIPTION OF THE DRAWING

The single FIGURE shows a VoIP (Voice over IP=Voice over Internet Protocol) communication network.

DETAILED DESCRIPTION OF INVENTION

The single FIGURE shows a VoIP (Voice over IP=Voice over Internet Protocol) communication network which comprises a plurality of communication installations and parties respectively connected thereto, which in a general sense are components B1-B6, C1-C6, D1-D6 in the communication network.

All of the components B1-B6, C1-C6, D1-D6 in the communication network are connected to one another by means of a packet switched network (IP network). In this case, the network is a hybrid form comprising ring-shaped and star-shaped intermeshing. In principle, it is also possible to use any other type of networking, provided that the components B1-B6, C1-C6, D1-D6 are certain to be able to interchange data with one another either directly or indirectly, that is to say with the interposition of other components. In the FIGURE, the lines between the components B1-B6, C1-C6, D1-D6 represent data links. The components B1-B6 in the form of servers provide a switching function in the communication network. This is also called a gatekeeper function. In a gatekeeper, the direct dial telephone numbers, which are also known from circuit switched telephony, are associated with the network addresses (IP addresses). The gatekeeper, e.g. component B1, is thus used to set up a communication link between two components C6, D1. During a call between the components C6, D1, the data packets containing the voice data are transferred directly between the components C6, D1, however, without—in contrast to circuit switched telephony—the interposition of a switching node. Only when a connection between the components C6, D1 is cleared down is information transmitted to the gatekeeper A again, namely information relating to connection cleardown.

Each component B1-B6, C1-C6, D1-D6 in the communication network can be monitored by one of the other components B1-B6, C1-C6, D1-D6, that is to say the component B1 the can be monitored by the components B2-B6, C1-C6, D1-D6, the component B2 can be monitored by the components B1, B3-B6, C1-C6, D1-D6 and so on, and each component B1-B6, C1-C6, D1-D6 can monitor any other component B1-B6, C1-C6, D1-D6, that is to say again the component B1 can monitor the components B2-B6, C1-C6, D1-D6, the component B2 can monitor the component B1, B3-B6, C1-C6, D1-D6 and so on. In this case, the components B1-B6, C1-C6, D1-D6 may be both terminals (that is to say telephones, telephony clients installed on PCs, video terminals or the like) and network components (that is to say communication servers, gateways, gatekeepers or the like).

All of the components B1-B6, C1-C6, D1-D6 are equipped for monitoring with a communication module as communication means (communication unit), which permits direct communication with the respective other components B1-B6, C1-C6, D1-D6, that is to say without interposition of a further entity. (In a communication network based on the Internet Protocol (IP network), fundamentally all of the components B1-B6, C1-C6, D1-D6 are equipped with such a communication module).

In addition, all of the components B1-B6, C1-C6, D1-D6 can be monitored and are therefore equipped with a storage unit as storage means (memory) storing the addresses of those components B1-B6, C1-C6, D1-D6 which need to be provided with state information about the network state.

Also, all of the components B1-B6, C1-C6, D1-D6 comprise a processing unit which is able to observe its own network state and to send changes, of state, via the communication module, to the addresses stored in a storage unit. For the purpose of monitoring, the processing unit in the monitoring component uses the communication module to set up a respective connection to the component B1-B6, C1-C6, D1-D6 which is to be monitored and stores it own address in the storage unit there.

It goes without saying that the processing unit in the component B1-B6, C1-C6, D1-D6 to be monitored and in the monitored component B1-B6, C1-C6, D1-D6 may respectively be various processing units or else various types of processing units, particularly if some of the components are monitorable only and some are monitoring only.

The text below describes by way of example the flow of a monitoring operation between the components D1 and C6, where the network state ("free", "busy" or "in call state") of a monitored component D1 is intended to be indicated on a monitoring component C6.

In this case, a user first activates, on an IP telephone as the monitoring component C6, a function for permanently indicating the call state of the component D1, which is likewise an IP telephone. To this end, the user inputs the appropriate command and the telephone number of the component D1 on the component C6. The component C6 first converts the direct dial number of the component D1 into the network address, that is to say the IP address, of the component D1 internally in the appliance. In cases in which this association cannot be made using a table which already exists in the component C6, the network address of the component to be monitored is assessed by checking with the gatekeeper A. The component C6 now uses the network to send a monitoring instruction directly to the component D1, said instruction firstly containing details about what states and changes of state are to be monitored and secondly containing the network address of the component C6 to which the states or change of state are to be transmitted. In this case, it is necessary to monitor the call state of the component D1, that is to say the states "free", "busy" and "involved in a call" ("telephone ringing"). The component D1 receives this monitoring instruction and stores the address of the component C6 together with the information about what states are to be monitored in a memory area provided for the purpose, provided that the number of addresses already stored therein has not already reached a previously stipulated maximum value. The address to be stored must also not have been entered in a "prohibited list" or satisfy a "prohibited condition", and a decision may also be made on the basis of "authority lists" or "authority conditions". Following storage, monitoring means (provided) which, by way of example, may be arranged in the processing unit in the component D1 are used to start a monitoring process which continually monitors the call state of their own component D1. The component D1 then uses the communication means (communication unit) to transmit to the component C6 an acknowledgement message confirming the start of monitoring. This acknowledgement message already contains the information about the current call state, and this information is stored in the component C6 as starting value. On the display of the component C6, an indicator field for the component D1 is then set up, said indicator field having or being able to show various symbols for the three call states and showing the current call state as start value.

If the acknowledgement message does not appear within a prescribed period or if the acknowledgement message is negative, then an "unobtainable" or "unmonitorable" state is shown. If the acknowledgement message does not appear, a fresh monitoring instruction can be sent at intervals of time so that monitoring starts as soon as the component D1 is available again. The availability of a component D1 which is to be monitored can also be determined using the PING method known from IP networks, which involves a specific data packet being transferred via the network as a test message.

As soon as the call state of the component D1 changes, for example whenever the user of the component D1 starts a call, this is recorded by the monitoring process in the component D1 and a corresponding message is sent to all those addresses in the previously described memory area with which the monitoring of the call state is associated. Thus, in this case, the ongoing call means that a message comprising the "busy" call state is transmitted from the component D1 to the component C6. On the display of the component C6, the component D1 is now assigned a symbol which visually indicates the new "busy" call state.

The component C6 also uses this information for the purpose of only ever providing the user operating on it with the communication channels which are currently possible. If the user of the component C6 starts a call to the component D1, then corresponding advice of the "busy" call state may immediately be given and, as an alternative communication channel, an input field for inputting a text-based short message (SMS), in which the direct dial number for the component D1 has been preassigned in the address field, may automatically be activated.

The invention claimed is:

1. An arrangement, comprising:
a plurality of network components comprising a monitoring component and a monitored component, each respective one of the plurality of network components comprising:
a communication unit providing a direct communication to each of the other of plurality network components,
a memory, the memory having an address of the monitoring component when the respective one of the plurality of components is being monitored,
a processing unit,
the processing unit monitors a voice call state of the respective one of the plurality of components, state information indicating call state is sent via the communication unit to the stored address when the respective one of the plurality of network components is being monitored, the voice call state indicates an availability of the respective one of the plurality of network components for voice communication, and
the processing unit transmits a monitoring instruction to the monitored component when the respective one of the plurality of components is monitoring, the monitoring instruction comprises the address of the respective one of the plurality of network components and sent directly to the monitored component via the communication unit,
wherein each of the plurality of network components is:
addressable in a communication network,
monitorable by each of the other of the plurality of network components via the processing unit, and
equipped for monitoring each of the other plurality of network components via the communication unit, and
wherein the communication network providing voice communication between the plurality of network components.

2. The arrangement as claimed in claim 1, wherein the communication network is a packet switched network.

3. The arrangement as claimed in claim 2, wherein each of the network components are voice over IP telephones.

4. The arrangement as claimed in claim 1, wherein a maximum number of addresses stored is predetermined, each address stored is an address of a monitoring component.

5. The arrangement as claimed in claim 4, wherein each of the network components is selected from the group consisting of telephone, telephony client, server, gateway, and gatekeeper.

6. The arrangement as claimed in claim 1, wherein the monitoring instruction comprises information about which changes of voice call state are to be sent as state information.

7. The arrangement as claimed in claim 6, wherein the monitored component sends state information after a change in state.

8. The arrangement as claimed in claim 1, wherein the monitoring component uses the information about voice call states or changes of voice call state for visual indication.

9. The arrangement as claimed in claim 1, wherein the monitored component disables an individual monitoring component or all monitoring components.

10. The arrangement as claimed in claim 1, wherein while an acknowledgement to the monitoring instruction is not receive by the monitoring component, the monitoring component repeats the transmission of a monitoring instruction at stipulated intervals of time.

11. The arrangement as claimed in claim 10, wherein the information about the transmitability of the monitoring instruction is used to determine a voice call state for the component which is to be monitored.

12. The arrangement as claimed in claim 1, wherein each of the network components are telephony clients.

13. The arrangement as claimed in claim 1,
wherein each network component includes a memory for storing a list of addresses prohibited from monitoring the monitored component, and
wherein when the prohibited list of the monitored component includes the address of the monitoring component, the monitored component is not monitored by the monitoring component.

14. A method for obtaining information about a voice call state or a change of voice call state in a component which is to be monitored and which is part of an arrangement having addressable components which are connected in the communication network, the method comprising:
directly transmitting a monitoring instruction by a monitoring component to a monitored component, wherein the instruction comprises the address of the monitoring component;
storing the address of the monitoring component by the monitored component;
monitoring a voice state of the monitored component by the monitored component, the voice state indicates an availability of the respective component for voice communication; and
sending an acknowledgement from the monitored component the monitoring component in response to receiving the monitoring instruction, the acknowledgement including information pertaining to the voice call state of the current availability of the monitored component.

15. The method as claimed in claim 14, further comprising:
predetermining a maximum number of addresses of a monitoring component which can be stored in memory.

16. The method as claimed in claim 14, further comprising:
canceling the monitoring by the monitored component.

17. The method as claimed in claim 14, further comprising:
while an acknowledgement to the monitoring instruction is not received by the monitoring component,
outputting a corresponding indicator by the monitoring component; and
repeating the transmission of a monitoring instruction at stipulated intervals of time.

18. The method as claimed in claim 17, wherein when the acknowledgment is not received information about the ability to transmit the monitoring instruction is used to determine a voice call state for the component which is to be monitored.

19. The method as claimed in claim 14, further comprising:
receiving a command by the monitoring component from a user of the monitoring component, the command comprising the telephone number of the monitored component; and
converting the telephone number by the monitoring component to a network address for the monitored component, wherein the monitored instruction is sent using the network address for the monitored component.

20. The method as claimed in claim 14, wherein the user of the monitoring component initiates a call to the monitored component.

21. The method as claimed in claim 20, wherein the user is provided an input field for inputting a text message to be sent to the monitored component when the monitored component is busy.

22. The method as claimed in claim 14, wherein the state information comprises a change of voice call state of the monitored component.

23. The method as claimed in claim 22, wherein the monitoring instruction comprises information about which changes of voice call state are to be sent a state information.

* * * * *